United States Patent [19]

Ower, deceased et al.

[11] Patent Number: 4,757,640
[45] Date of Patent: Jul. 19, 1988

[54] CULTIVATION OF MORCHELLA

[75] Inventors: Ronald D. Ower, deceased, late of San Francisco, Calif., by George A. Yeoman, executor; Gary L. Mills, East Lansing; James A. Malachowski, Haslett, both of Mich.

[73] Assignee: Neogen Corporation, Lansing, Mich.

[21] Appl. No.: 872,823

[22] Filed: Jun. 11, 1986

Related U.S. Application Data

[63] Continuation-in-part of Ser. No. 728,176, Apr. 29, 1985, Pat. No. 4,594,809.

[51] Int. Cl.$^4$ .............................................. A01G 1/04
[52] U.S. Cl. ...................................................... 47/1.1
[58] Field of Search .................... 47/1.1, 1.3, 58; 71/1, 71/3

[56] References Cited

U.S. PATENT DOCUMENTS

| | | | |
|---|---|---|---|
| 3,942,969 | 3/1976 | Carroll et al. | 47/1.1 |
| 4,164,405 | 8/1979 | Pinkard | 71/3 |
| 4,229,442 | 10/1980 | Pinkard | 71/3 |
| 4,370,159 | 1/1983 | Holtz | 47/1.1 |
| 4,594,809 | 6/1986 | Ower et al. | 47/1.1 |

FOREIGN PATENT DOCUMENTS

| | | | |
|---|---|---|---|
| 0107911 | 5/1984 | European Pat. Off. | 47/1.1 |
| 0112156 | 9/1978 | Japan | 47/1.1 |
| 0124678 | 10/1978 | Japan | 47/1.1 |
| 8500002 | 1/1985 | World Int. Prop. O. | 47/1.1 |

OTHER PUBLICATIONS

San Antonio, J. A. et al, "Cultivation of Paddy Straw Mushroom *Volvariella Volvacer*" Hortscience vol. 7(5) pp. 461–464, Oct. 1972.

Bels, R. J. et al, "The Challenge to *Agaricus Bisporus* from Other Fungi" (paper to) NGA Brighton Conference, Oct. 1973.

Lambert, E. B. "Principles and Problems of Mushroom Culture" Botanical Review, vol. 4, Jul. 1938, pp. 419 and 420 only.

R. Ower, "Notes on the Development of the Morel Ascocarp: Morchella Esculenta," *Mycologia*, 74(1): 142 (1982).

*Primary Examiner*—James R. Feyrer
*Attorney, Agent, or Firm*—Fitch, Even, Tabin & Flannery

[57] ABSTRACT

The invention pertains to culturing ascoscarps or fruitbodies of species of the genus Morchella. Mycelia are provided with nutrients and subsequently produce nutrient-primed mycelia, such as nutrient-rich sclerotia or nutrient-rich hyphae, in which are stored sufficient nutrients to supply the ascocarps that develop later. The fungus is induced to give rise to ascocarp development by initially maintaining the fungus in an environment that is poor in exogenous nutrients, and by exposing the fungus to a high level of water. After induction, primordia appear. The period from primordia appearance until midway to maturation of the fruitbodies represents a critical period during which the fruitbodies are prone to abort. During this critical period, particular attention is directed to maintaining favorable conditions. The fruitbodies, which may be grown to maturation, are ultimately harvested.

14 Claims, No Drawings

CULTIVATION OF MORCHELLA

This application is a continuation-in-part of pending application U.S. patent application Ser. No. 728,176 filed Apr. 29, 1985, now U.S. Pat. No. 4,594,809.

The present invention is directed to cultivation of the morel fungi i.e., species of Morchella, including their mature, edible ascocarps.

BACKGROUND OF THE INVENTION

The genus Morchella contains the species of mushrooms known as morels or sponge mushrooms. They belong to the ascomycetous fungi. True morels are edible and delicious. Indeed, some consider them the most delectable of all the fungi. While the taste of these mushrooms is known and loved by those who search the forests in the early spring, morels are unavailable to the general population because heretofore they have defied cultivation such as would be practical for commercial production year round.

To the connoisseur of mushrooms, morels are known by their ascocarp or fruitbody (the visible mushroom). One would suppose that if these fungi grow freely without cultivation in the wild or natural state, cultivation methods would have been developed to maximize their production. This, however, has not been the case. There are reports of growing morels outdoors; however, no one has succeeded in cultivating morels, like the common Agaricus species or other edible forms, in environmentally controlled rooms and harvesting them throughout the year.

Ascocarp or fruitbody production is the mature embodiment of the sexual reproduction cycle of the morel. The mature ascocarp containing ascospores or germ spores represents the culmination of a life cycle highlighted by an internal mating of two haploid nuclei to form a diploid nucleus which undergoes meiosis to form new haploid ascospores. Both autogamous and heterogamous pairing prior to meiosis have been reported for Morchella. An alternative life cycle is an asexual process in which conidia (asexual spores) are produced and from which new mycelium, containing haploid nuclei, can be grown.

Also, as a means of protecting the species under certain conditions, the vegetative mycelia coalesce into hardened bodies known as sclerotia which may lie dormant during periods of unfavorable conditions. Accordingly, fruiting of the morel occurs during select conditions; a situation recognized by mushroom hunters who have experienced "bad years" for morel gathering.

It is a general object of the invention to provide a method for culturing morels in a manner suitable for commercial production of ascocarps throughout the year under controlled conditions.

DEFINITIONS

For purposes of clarity, terms used in this application are defined as following in C. J. Alexopoulos and C. W. Mims, *Introductory Mycology*, 3rd Ed., John Wiley & Sons, New York (1979).:

Ascocarp—a fruitbody containing asci.
Ascospore—a meiospore borne in an ascus.
Ascus—(pl. asci) a sac-like cell generally containing a definite number of ascospores (typically eight) formed by free cell formation usually after karyogamy and meiosis; characteristic of the class Ascomycetes.
Condiophore—a simple or branched hypha arising from a somatic hypha and capable of bearing at its tip or side one or more conidiogenous cells.
Conidium—(pl. conidia) sometimes called conidiospores, a nonmotile asexual spore usually formed at the tip or side of a cell; in some instances a pre-existing hyphal cell may transform into a conidium.
Hypha—(pl. hyphae) the unit of vegetative structure of most fungi; a tubular, filamentous cell containing asexual nuclei.
Mycelium (pl. mycelia) mass of hyphae constituting the body (thallus) of a fungus.
Primordium (pl. primordia) the beginning stage of any structure.
Sclerotium (pl. sclerotia) a hard surfaced resting body of fungal cells resistant to unfavorable conditions, which may remain dormant for long periods of time and resume growth on the return of favorable conditions.
Substratum (pl. substrata) for the purpose of this document substratum will be defined as the soil-like material which serves as the habitat in which the fungus grows and from which the fungus produces fruitbodies.
Nutrient-rich hyphae is defined herein as asexual hyphae developed in the presence of a nutrient source either in an aqueous medium or in a substratum.
Nutrient-primed mycelia is defined herein as asexual mycelial growth material containing sufficient stored nutrients so as to be inducible into the sexual cycle of Morchella growth, this term includes both nutrient-rich sclerotia as defined above and nutrient-rich hyphae as defined above.

SUMMARY OF THE INVENTION

The invention provides for the culturing of species of the genus Morchella to produce mature ascocarps or fruitbodies. Vegetative mycelia are fed nutrients for development into nutrient-primed mycelia, such as nutrient-rich hyphae or sclerotia, in which are stored sufficient nutrients to supply substantially the entire nutrient requirements for subsequent development of fruitbodies. Subsequent to feeding, the environment of the nutrient-primed mycelia is substantially altered in order to promote the sexual cycle of growth in which ascocarps (visible mushrooms) are produced. Contributing to this process is removal of available exogenous nutrients from the nutrient-primed mycelia. Also contributing to this process is exposure of the nutrient-primed mycelia, and additional mycelia that grow therefrom, to high levels of substratum water. The sexual cycle of growth is first evidenced by the appearance of primordia and culminates in mature fruitbodies. The growth period from primordia appearance to about the time of fruitbody maturation is an especially critical time of development, and conditions are carefully controlled to minimize abortion of the developing fruitbody. One important factor in minimizing abortion of the developing fruitbody is ensuring previous storage of sufficient nutrients, particularly neutral lipids, in the nutrient-primed mycelia to support subsequent fruitbody development and maturation. Other important factors are the maintainance of correct air humidity and substratum moisture during fruitbody development and proper ventilation during fruitbody development. Other factors include maintaining optimal air velocity relative to the habitat and maintaining a daily water loss from the habitat.

DETAILED DESCRIPTION OF THE PREFERRED EMBODIMENTS

The invention provides for the culturing of morels to produce ascocarps or fruitbodies. The spawn that are used for morel cultivation are nutrient-primed mycelia, including sclerotia, which are resting bodies and nutrient reservoirs that are somewhat resistant to unfavorable conditions, and also including nutrient-rich hyphae such as that developed in an aqueous nutrient medium. Such nutrient-primed mycelia, depending upon environmental conditions, may either sustain additional asexual vegetative mycelial growth or give rise to the sexual cycle and mature ascocarps. Nutrients, particularly neutral lipids, in the form of triglycerides, are stored in the nutrient-primed mycelia, and during the sexual cycle, substantially all of the nutrients necessary for fruitbody development are drawn from these and other stored nutrients.

Accordingly, the invention provides for production or cultivation of nutrient-primed mycelia which contain sufficient storage of nutrients necessary for subsequent development to ascocarps. Conditions are then adjusted appropriate to induce the nutrient-primed mycelia to enter the sexual growth cycle. Substantial care is taken during development from primordia appearance to ascocarp maturation to maintain conditions that ensure that the developing ascocarps do not abort. In particular, conditions of soil moisture, humidity and air-exchange are maintained as necessary to promote ascocarp development and minimize disease.

The first step of morel production is the development of nutrient-primed mycelia spawn. The use of nutrient-primed mycelia as spawn represents an important aspect of the invention with regards to efficient production of morels. Although cultivation of morels could be effected starting with spores, production would be much slower and, thus, impractical for commercial cultivation. In addition, the traditional use of grain spawn would be inappropriate because the spawn would lead to cultures that are highly contaminated with other fungi and bacteria.

One method is to culture sclerotia for use as inoculum spawn. A common method of culturing sclerotia is to fill a container with wheat or other vegetative material to between about 40 to about 80 percent of its volume. The wheat is then covered with a perforated liner, typically plastic film or metal foil, although other materials can be used, and the remaining 20 to 60 percent of the container volume is then nearly filled with moist soil. The volume of the container may range from about 50 ml to multiple liters, but is typically about 500 ml. The wheat berries or other vegetative material may be supplemented with additional nutrients consisting of both organic and inorganic nitrogen sources, other minerals, vitamins and carbohydrates which help to promote storage of the nutrients that are required during subsequent ascocarp development. The container is covered and autoclaved to kill possible contaminating organisms. The soil layer of the sterilized container is inoculated with ascospores, with vegetative hyphae or with small pieces of sclerotia, and the jar is again sealed. The container is maintained at a temperature of between about 10° C. and about 30° C. and preferably between about 18° C. and about 22° C.

Hyphae from the inoculum grow through the soil layer and colonize the grain. After about one week, a loosely compacted mass of hyphae appear in the soil layer. Microscopically viewed, the hyphal cells become highly branched, septate and swell to a barrel shape. This is then followed by the adhesion of adjacent cells to form a solid mass that is visible to the naked eye. It is the sclerotial hyphal cells which store the materials obtained from the colonized grain. The sclerotia at maturity are hard structures which can become quite large. Virtually all of the total soil layer can become enmeshed in the the sclerotia.

At this point, the sclerotia are harvested for use as spawn. Some of the developed sclerotia may be reserved as "jar inoculum" for producing additional sclerotia, or for other uses.

An alternative method is to culture aqueous-developed mycelia for such spawn. For example, mycelial inoculant is grown statically at room temperature, i.e., about 22° C. for 3-4 weeks in a liquid nutrient medium. Although many different media can be used, one such medium is potato dextrose broth, a liquid medium commonly used to culture many different fungi. Hyphae within such mycelia usually do not form adhesive aggregates nor hardened structures; however upon reaching maturity they do contain nutrient reserves sufficient to supply substantially the entire nutrient requirements for subsequent development of fruitbodies.

The use of nutrient-primed mycelia as spawn has several advantages with respect to the efficient production of morels. In addition to growing at a rate commensurate with serving as a steady source of inoculum, nutrient-primed mycelia, particularly sclerotia, may be preserved for extended periods of time. It is possible that, in nature, sclerotia remain dormant for extended periods of time, such as over the winter months, until conditions become favorable for initiation of growth. Storage at about 5° C. is found to be satisfactory for long-term preservation.

Mature nutrient-primed mycelia are used as spawn to inoculate appropriate substratum. Two variations on the method of the present invention may be followed. In the first variation (Method I), nutrient-primed mycelia, preferably in the form of sclerotia, are divided into pieces which are used to inoculate a substratum. Upon addition of nutrients, additional nutrient-primed mycelia are formed within the substratum before induction to the sexual cycle. In the second variation (Method II), nutrient-primed mycelia either sclerotia or aqueous-developed mycelia are directly inoculated into a substratum, and the nutrient-primed mycelia and any additional mycelia which grow therefrom are induced to the sexual cycle, without adding nutrients.

An important aspect of the invention is induction or triggering of the fungus to enter the sexual growth cycle in which ascocarps are produced. One important contributing factor in induction is deprivation of available exogenous nutrients to the fungus so that assimilation and storage of nutrients by the fungus ceases or significantly slows. Accordingly, the environment of the fungus is altered from a nutrient-rich environment to a nutrient-poor environment. For purposes of this invention, a "nutrient poor" environment is an environment lacking readily available nutrients for supplying developing ascocarps; thereby, such developing ascocarps utilize the nutrients which have been stored, as in the nutrient-primed mycelia.

Another important factor which appears to contribute to induction is exposure of the fungus to high quantities of water in the substratum in which the fungus is growing. Typically, the substratum is hydrated substantially to saturation for the purpose of promoting induction to the sexual cycle. By substantially saturated is meant at least about 90% of the capacity of the substratum to hold water, but preferably approaching 100% capacity Preferably, during exposure to high quantities of water, there is a continuous exchange of water. This may be accomplished, for example, by percolating water through the substratum in which the fungus is growing. Although Applicants are not bound to any theory as to why the high level of water seems to promote induction, the water may provide a triggering "shock" to the system, e.g., by change in osmotic pressure.

In Method I, nutrient-primed mycelia in the form of sclerotia are divided into pieces between about 0.5 and about 4 cubic centimeters in size and inoculated into a thin layer of substratum which is typically between about 1 and about 4 cm. deep. Good results occur when there are about 6 to about 30 cc. of divided sclerotia per square meter of substratum surface. Additional mycelial growth from sclerotial inoculum is enhanced by soaking the sclerotial pieces in water just prior to inoculating them into the substrate.

Preferred support substratum is nutrient-poor, permitting the availability of nutrients to be controlled through application and subsequent removal of an external nutrient source to the substratum. Suitable substratum includes any standard bark, soil or sawdust compost or potter's soil with or without added minerals known to those skilled in the art. For example, Supersoil® (R. McL. Co., San Francisco) has been used successfully either directly from the commercially sold bag or leached two times with two equal (v/v) volumes of water. The substratum should allow adequate drainage, should provide buffering capacity, should have good water-retaining capabilities, and should provide adequate aeration to allow proper gasous exchange. The substratum that is now being used is about 25% sand and about 75% organic material. A small portion of lime is also added. The organic portion of the soil is primarily ground fir bark (85%) and also contains 10% sphagnum and 5% redwood bark. The soil mixture has an available water content of 55% and an air capacity of 25%. It is expected, however, that a more optimal substratum may be developed.

The substratum is steam-pasteurized or hot water-pasteurized or autoclaved. Pasteurized substratum is then typically mixed with water to produce a workable slurry. The slurry is poured into a tray that has holes in its bottom for drainage. After the slurry is added to the desired depth in the tray, it is allowed to drain until the soil is void of gravitational water; i.e., is below field capacity, allowing for maximum air spaces. This is advantageous in at least two ways. First, it allows for increased sclerotia production, and more specifically, sclerotia are formed throughout the substratum. Secondly, removal of standing water helps to minimize later microbial contamination problems. Also, as an alternative approach for tray preparation, trays may first be filled with the substratum, as above, and then pasteurized.

After the poured substratum is inoculated with sclerotial pieces, the temperature around the tray is maintained between about 10° C. and about 22° C., the relative humidity is maintained between about 75 and about 95 percent, and the water content of the substratum is maintained between about 50% and about 75%. Soon after inoculation, hyphae grow from the sclerotia and completely colonize the tray in about one week. As the mycelia develop, no further water is added, thereby allowing the substratum to dry, preferably to a substratum moisture content of below about 75%. Drying of the substratum prior to feeding is considered to be an important factor in inhibiting growth of bacteria and other fungi which would harm or compete with the developing morels.

Morels, being fungi, do not produce their own food as do photosynthesizing plants, but rather obtain their total nutrient supply from external sources. When a nutrient-poor substratum is deliberately provided, the morel tissue must sometime be provided with the requisite nutrients, and in this variation, nutrients are fed to the mycelia growing from the inoculum. The additional nutrient-primed mycelia in the form of sclerotia that develop from the vegetative growth after such nutrient addition should contain, in stored form, substantially all of the nutrients that are needed for efficient fruitbody development.

Nutrients are provided to the mycelial growth material in a manner so that the nutrients may be later withdrawn to leave the substratum again nutrient-poor. Removal of nutrients promotes differentiation of nutrient-primed mycelia into the sexual cycle and decreases the incidence of contamination.

As a convenient means of providing a removable source of nutrients, a nutrient-rich medium is placed onto the substratum, into which source hyphae can grow and from which source the hyphae can distribute nutrients throughout the mycelia colony. As one means of providing such a source, jars are prepared similar to those used to culture the sclerotia. Typically jars are nearly filled with organic material; a perforated heat resistant liner (usually metal foil) is placed over the organic material; and the liner is covered with soil to the top of the jar. The jar is again covered with another layer of perforated foil, further sealed with a sheet of metal foil and then sterilized.

The nutrient source with which the jar is nearly filled provides the organic material. The organic material is metabolized and eventually is stored in the sclerotia as carbohydrates and lipids. The stored material is eventually utilized for ascocarp formation. The nutrient source most commonly used in the development of this cultivation method is wheat berries; however, other vegetative material, including mixed compost, is suitable. If wheat berries are the nutrient source, they should be provided at a ratio of about 1000 grams to about 8000 grams (dry wt.) per square meter of substratum. However, this ratio may vary significantly and is considered only as a general approximation.

It is desirable that as much sclerotia be produced within the substratum as is possible during this stage because there appears to be a direct relationship between the amount of sclerotia in the substratum and the total weight of ascocarps that develop per unit area of the substratum. Growth of sclerotia in substratum parallels growth of sclerotia in jars, and the same nutrient factors which enhance growth in the jars enhance growth in the substratum. Accordingly, the organic material may be supplemented with vitamins, minerals, additional protein and other substances.

In this example of Method I, the top layer of foil is removed from the cooled sterilized jars, and the jars are inverted onto the surface of the substratum. Hyphae grow upward through the holes in the second layer of foil, gather nutrients and distribute the nutrients to the mycelial colonies. During feeding, the soil moisture is maintained at a level of between about 45% and about 70%, the relative humidity is maintained at between about 85% and about 95% and the temperature is maintained between about 10° C. and about 22° C. Feeding continues for a period of between about 7 and about 40 days, typically about 16 days. At the end of the feeding period, both conidia and sclerotia may be observed in substantial numbers on the surface of the substratum.

Having provided the mycelial growth and newly formed attendant sclerotia with substantially all of the nutrients needed for subsequent ascocarp formation, the nutrient source is removed. Removal of the nutrients is a necessary step for cultivation because the sexual cycle will not commence to any appreciable extent in the presence of excess nutrients that are external to the mycelia. The use of an inverted jar or the like containing nutrient material permits the immediate removal of most of the available nutrients, leaving the mycelia in a nutrient-poor substratum.

Subsequent to removal of the nutrient source, a small amount of additional moisture is added to the substratum, e.g., about 1 liter per square meter of substratum surface, and vegetative growth is allowed to continue for a period of about ten days. During this period, the substratum moisture content is maintained at between about 45% and about 70%, the relative humidity is maintained at between about 85% and about 95% percent, and the temperature is maintained at between about 10° C. and about 22° C. After this period, the sclerotia have matured.

The mature sclerotia and associated mycelia, rich in stored nutrients but deprived of exogenous nutrients, are now ready for exposure to high amounts of water, which contribute to induction to the sexual cycle. Preferably the substratum and morel mycelium are hydrated by a slow percolation of water through the substratum for a period of between about 12 and about 36 hours. Water is added to the substratum at a rate of between about 250 and about 1000 ml per hour per square meter of substratum surface area. The substratum and the percolating water are maintained at a temperature of between about 10° C. and about 22° C.

In Method II, either the mature nutrient-primed sclerotia which are produced in the jars or the nutrient-primed mature aqueous-developed mycelia are inoculated into a wetted, nutrient-poor substratum at a much higher rate, e.g., typically between about 1500 and 4000 grams (fresh weight) per square meter of substratum surface. These nutrient-primed mycelia contain all the stored nutrients that are necessary for hyphal proliferation and subsequent fruitbody development. The nutrient-primed mycelia may be inoculated into the substratum whole or divided. Sclerotia may be inoculated directly from the jars described hereinbefore or wetted with water first, e.g., typically an 18 to 24 hour immersion. Aqueous-developed mycelia are simply removed from the aqueous nutrient medium and carefully washed with water. Inoculation into the nutrient-poor substrate represents an additional deprivation of exogenous nutrients to the nutrient-primed mycelia, one of the factors found to contribute to induction to the sexual cycle of growth.

The other factor found to contribute importantly to induction, i.e., exposure to high amounts of substratum water, may commence contemporaneously with inoculation into the substrate or a relatively short period of time thereafter. The substratum may be thoroughly wetted at about the time of inoculation to provide the high amount of water which promotes induction. Better results, however, are obtained if the nutrient-primed mycelia are maintained in the substratum and additional mycelial growth is allowed to colonize the substratum for about seven days under conditions similar to conditions during that period in Method I when the sclerotia are maintained in the nutrient-poor substratum but before water is percolated through the substratum. Next, in a similar manner to the first variation, water is percolated through the substratum, promoting initiation of primordia from the nutrient-primed mycelia.

There are several advantages to Method II relative to the Method I. One of the more notable advantages of Method II is the permissible depth of the substratum. For this method, the substratum can be considerably deeper, typically between about 6 and about 16 cm. Cultures with a thicker substratum can contain more nutrient-primed mycelia and thus eventually support more ascocarps per unit area of substratum surface than can a thinner substratum layer.

However, Method I may be preferred because it is more closely analogous to processes used to cultivate other types of fungi and, therefore, may be more adaptable to cultivation in existing facilities or with available apparatus.

Following hydration in either method, the substratum is allowed to drain, and the cultures may be aspirated to further remove water. The relative humidity is maintained at between about 85% and about 95%, and the temperature is maintained at between about 10° C. and about 22° C. The substratum moisture content is maintained at between about 55% and about 65% during this period.

At the end of this period, i.e., approximately 1–3 days after hydration, morel primordia start to form. Primordia are spherical hyphal aggregates which are about one millimeter in diameter. Within a few days, the primordia form protuberances which represent the first sign of ascocarp fundament formation.

A growth period extending from the initial appearance of primordia until the morel ascocarp reaches a height of about thirty millimeters represents an important period for ascocarp development. During this period, the temperature is maintained at between about 10° and about 22° C. and preferably about 18° C., the relative humidity at between about 85 and about 95 percent and the substratum moisture content at between about 50 and about 60 percent. Unless very favorable growth conditions are maintained, immature ascocarps are prone to abort.

It has been found that maximum yields of ascocarps are obtained when the air flow near the substratum is maintained at a substantially steady rate of between about 20 and about 40 cm per minute.

After the morel ascocarp reaches the height of thirty millimeters, conditions are maintained that are favorable to continued development and maturation. The temperature during this part of the maturation may range from about 10° C. to about 27° C., the relative humidity may range from about 80% to about 95% percent, and the soil moisture may range from about 30% to about 55%. As the ascocarps continue to develop, they may turn a dark grey. The ascocarp color then changes from grey to a golden-brown, at which point the morels are mature. After the first crop of ascocarps are harvested, the cultures may be reinduced to produce a subsequent crop(s).

Using the method as described above with *Morchella esculenta*, yields of 25 to 500 ascocarps per square meter have been obtained.

Although most of the development of the method has concerned isolates of *Morchella esculenta*, the methods of the invention are generally applicable to other species within the genus *Morchella*. For example, success with the species tentatively determined as *Morchella crassipes* and *Morchella costata* have been obtained.

As an alternative to growing nutrient-rich hyphae in a liquid nutrient, morel mycelia may be cultured in a substatum which uses paper and urea as the respective primary carbon and nitrogen sources and yields morel vegetative hyphae which are seemingly intermediate between normal filamentous hyphae and sclerotial hyphae. These "modified", somewhat enlarged, irregularly shaped hyphae are either found singley or in small non-coalesced clusters and are dispersed throughout the contents of the substratum.

In this procedure, nutrient-rich hyphae are cultivated following the protocol outlined in Method I. Sclerotia pieces are added to the substratum, and the fungus is allowed to grow for one week after which the sclerotia pieces are removed. Following colonization, a microwave-pasterized nutrient package is added to the surface of the substratum. This package is typically a plastic bag filled with moist paper, e.g., shredded 20-pound rag bond paper, the moisture content being less than 50% of the dry weight of the paper, preferably about 30-40%, and the underside of the package is perforated with small holes that provide entry points through which the fungus grows into the package. After the substratum resident mycelia grow into and occupy the paper packets, generally about 5-7 days, an aqueous solution of less than about 1%, e.g., about 0.5 weight %, of urea is applied, approximately 40 ml per square foot, to the substratum at 2-3 day intervals for an additional two weeks. The packets are then removed, and the cultures are treated similarly using the method outlined in Method I following nutrient removal.

While the invention has been described in terms of a particularly preferred embodiment, modifications obvious to one with ordinary skill in the art may be made without departing from the scope of the present invention. For example, conditions are described hereinabove which are particularly favorable for promoting growth of morels during various stages of their growth, such factors, including substratum moisture, temperature, humidity, air flow etc. It is to be understood that growth may well proceed, at a less favorable rate at conditions outside of the stated preferred conditions and that short-term excursions from the preferred conditions may not seriously affect the growth rate of morels. Thus, for example, whereas a lower temperature of a favorable temperature range is stated in respect to several stages of growth of the ascocarp, short term temperature excursions to temperatures approaching the freezing point of water are consistent with the continued survival of the ascocarps.

Various features of the invention are set forth in the following claims.

What is claimed is:

1. A method for culturing ascocarps of species of the genus Morchella comprising
    generating nutrient-primed mycelia in an aqueous nutrient medium,
    providing a nutrient-poor substratum and inoculating said nutrient-primed mycelia into said substratum,
    inducing said nutrient-primed mycelia to enter the sexual reproductive cycle of such species, and
    maintaining conditions appropriate for development of ascocarps of such species.

2. A method according to claim 1 wherein said nutrient-primed mycelia are generated in potato dextrose broth.

3. A method according to claim 1 wherein said mycelia are induced to the sexual reproductive cycle through the deprivation of exogenous nutrients and by exposure to high amounts of water.

4. A method according to claim 3 wherein for a period subsequent to inoculation, said nutrient-primed mycelia are maintained in said nutrient-poor substratum at a substratum moisture content of between about 45% and about 70%, a relative humidity of between about 85% and about 95% and a temperature of between about 10° C. and about 22° C., and subsequently, said substratum is hydrated to expose said nutrient-primed mycelia to high amounts of water.

5. A method according to claim 3 wherein subsequent to induction, the water content of said substratum is adjusted to between about 55% and about 65%, the relative humidity is maintained at between about 85% and about 95% and the temperature is maintained at between about 10° C. and about 22° C. until primordia appear.

6. A method according to claim 3 wherein from the appearance of primordia until ascocarp development to a height of about 30mm, the water content of said substratum is maintained at between about 50% and about 60%, the relative humidity is maintained at between about 85% and about 95% and the temperature is maintained at between about 10° C. and about 22° C.

7. A method according to claim 3 wherein during said period from primordia appearance until ascocarp development to a height of about 30 mm, the air flow near said substratum is maintained at between about 20 and about 40 cm per minute.

8. A method according to claim 3 wherein, from a period from ascocarp development at a height of about 30 mm to ascocarp maturity, the water content of said substratum is maintained at between about 30% and about 55%, the relative humidity is maintained at between about 80% and about 95% and the temperature is maintained at between about 10° C. and about 27° C.

9. A method according to claim 4 wherein said substratum is hydrated by percolating water through substratum at rate of between about 250 and about 1000 ml per m$^2$ of substratum surface per hour.

10. A method according to claim 9 wherein said water at a temperature of between about 10° C. and about 22° C. is percolated for a period of between about 12 and about 36 hours.

11. A method for culturing ascocarps of species of the genus Morchella comprising
    cultivating asexual mycelial growth of such species in the presence of a nutrient that provides both organic and inorganic nutrients for a period of time sufficient for said mycelial growth to mature into nutrient-primed mycelia in which are stored the nutrient supply needed for subsequent ascocarp development,
    inducing said nutrient-primed mycelia to the sexual growth cycle of such species,
    and maintaining conditions appropriate for development and maturation of ascocarps of such species, wherein said cultivation and induction are carried out by inoculating a nutrient-poor substratum with pieces of nutrient-primed mycelia, wherein mycelial growth in said substratum is promoted from said inoculum, wherein the environment of said substratum is appropriately regulated to colonize said substratum with hyphae, and wherein following said colonization a nutrient source, which includes cellulosic material plug a nitrogen source and which promotes the storage of essential nutrients in said hyphae, is supplied to said hyphae.

12. A method according to claim 11 wherein said nutrient source includes an aqueous solution of urea which is supplied by periodic applications.

13. A method according to claim 12 wherein said nutrient source includes paper having a moisture content less than about 50%.

14. A method according to claim 13 wherein an aqueous solution containing less than about 1% urea is applied each 2 to 3 days in an amount of at least about 40 ml per square foot.

* * * * *